United States Patent [19]

Rees

[11] Patent Number: 4,790,432

[45] Date of Patent: Dec. 13, 1988

[54] TACKLE BOX ASSEMBLY

[76] Inventor: Michael Rees, 1604 Lemon, Highland, Ill. 62249

[21] Appl. No.: 51,414

[22] Filed: May 19, 1987

[51] Int. Cl.⁴ .............................................. A47C 7/62
[52] U.S. Cl. ............................... 206/315.11; 297/192; 312/250; 248/223.4; 248/214.2
[58] Field of Search ............... 312/380, 245; 211/70.6; 248/429, 223.4, 224.2; 297/192; 206/315.11, 503

[56] References Cited

U.S. PATENT DOCUMENTS

| | | | |
|---|---|---|---|
| 671,486 | 4/1901 | Laumann | 248/224.2 |
| 2,135,401 | 11/1938 | Kiff | 206/503 |
| 3,077,327 | 2/1963 | Batie . | |
| 3,131,968 | 5/1964 | Alt | 297/192 |
| 3,623,683 | 11/1971 | Bennett | 297/192 |
| 3,802,654 | 4/1974 | Janko et al. | 248/223.4 |
| 4,061,395 | 12/1977 | Boole | 297/192 |
| 4,103,965 | 8/1978 | Engman | 297/192 |
| 4,500,059 | 2/1985 | Papizan | 248/205.1 |

OTHER PUBLICATIONS

Bass Pro-Shops Catalog 1986 Edition pp. 99 and 107, Published by Bass Pro-Shops, Springfield, Mi.

Primary Examiner—Joseph Man-Fu Moy
Attorney, Agent, or Firm—Don W. Weber

[57] ABSTRACT

A portable, attachable fishing tackle-box is presented which may be quickly and easily attached to the underside of a standard pedestal fishing seat. The tackle-box assembly comprises a tackle-box with a plurality of drawers and a front cover that is separable into an upper and a lower section. Brackets or other suitable attaching means are provided to secure each section to the underside of a fisherman's seat so that the sliding drawers face outwardly. The relative position of the sections remains constant with respect to the fisherman even when the seat swivels.

3 Claims, 3 Drawing Sheets

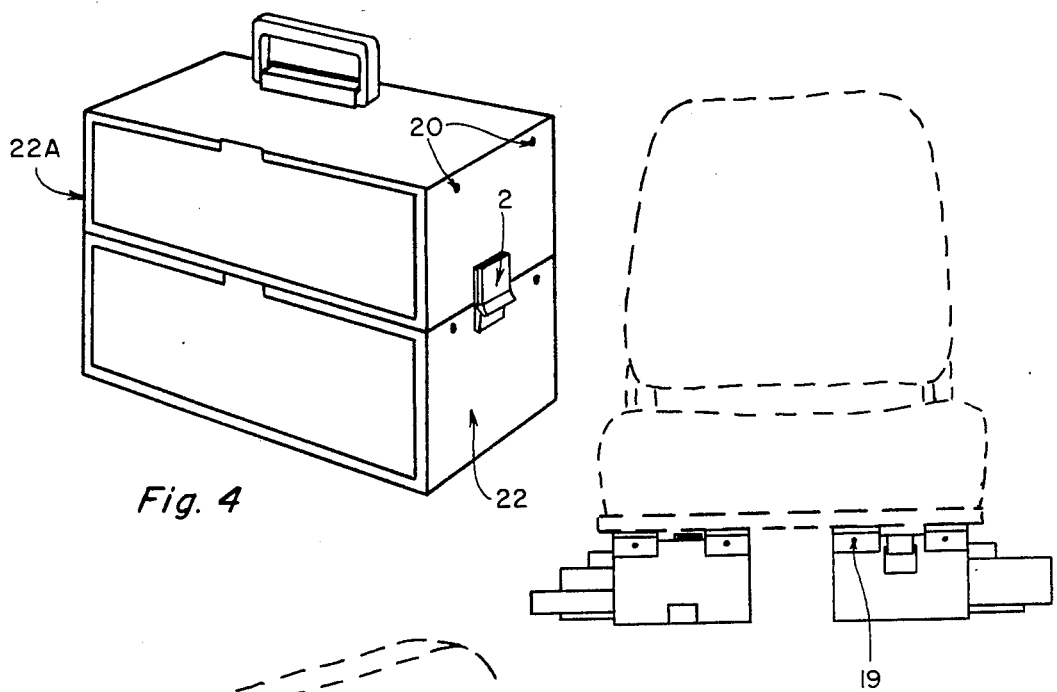
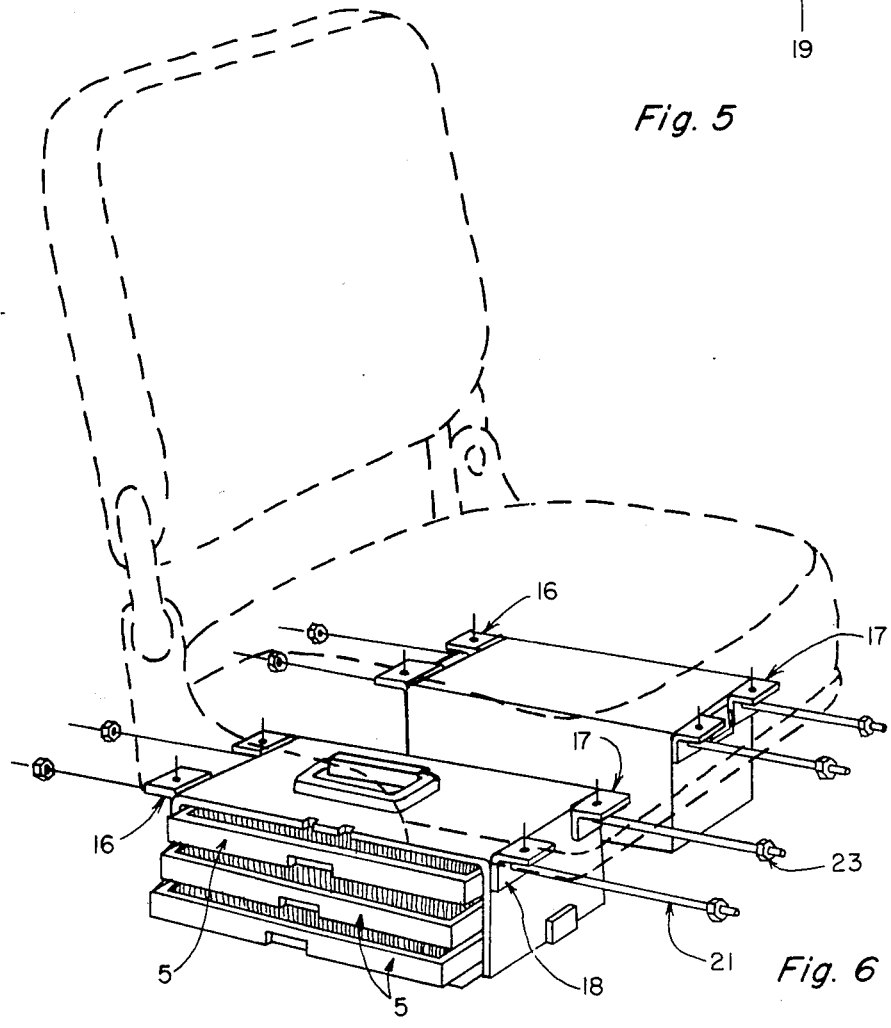

TACKLE BOX ASSEMBLY

BACKGROUND OF THE INVENTION

The present invention relates to the sport of fishing and more particularly to the containers used to hold fishing gear such as hooks, lines and pliers.

Experienced fisherman have a need for varying fishing gear. Keeping this gear in order and storing it out of the way has long been the subject of research and discovery. The earliest tackle boxes comprised hinges trays and the like. Other improvements included multi-drawered boxes and boxes that hang from the bottom of portable chairs and trays, such as described in Papizan's U.S. Pat. No. 4,500,059.

Newer fishing boats used for recreational use usually have a flat base and a chair or chairs attached to the base. The chair generally and usually is attached to a vertical pedestal. The chair swivels in a 360° range. Heretofore, the devices used to contain fishing gear were either too small or cumbersome to use. For example, a full sized tackle-box is able to hold the gear, but must be set on the floor of the boat. The box is awkward to reach and may cause injury if a fisherman gets in a hurry and stumbles over the box. A smaller fishing seat tray has been invented, but it does not have the capacity to hold the wide variety of fishing gear required.

The present invention utilizes the space underneath the fishing seat in a unique and compact manner. In the Rees Tackle-Box there is abundant room for all the fishing gear needed and it is also up off of the floor and out of the way. In addition, because of the unique under-the-seat arrangement of the tackle-box sections, the trays swivel as the seat is turned and thus remain in the same position relative to the fisherman at all times.

An object of this invention is to create a tackle-box that is large enough for all of a fisherman's gear and yet is out of the way of the fisherman.

Another object is to allow ready access to a tackle-box that remains in the same position relative to the fisherman regardless of how many times the seat is turned.

Other objects of this invention will become obvious upon further inspection of this specification.

SUMMARY OF THE INVENTION

A portable, attachable, fishing tackle-box is presented that is capable of attachment to the underside of a fishing chair for convenience and economy of space. A multi-drawered fishing tackle-box comprises upper and lower sections. Each section is self-contained with a plurality of drawers and a front cover that folds underneath the bottom drawer when in use. Each section is attached to the underneath of a fishing chair and arranged so that the drawers open outwardly from each side of the chair.

BRIEF DESCRIPTION OF THE DRAWINGS

FIG. 4 is a perspective view of the tackle-box showing the long threaded-rod embodiment without the rods attached.

FIG. 5 is a front view of the long-threaded-rod embodiment shown in place underneath the seat with the drawers open.

FIG. 6 is an exploded perspective view of the long-threaded-rod embodiment showing the short brackets attached underneath the seat.

DESCRIPTION OF THE PREFERRED EMBODIMENT

Figure 2:
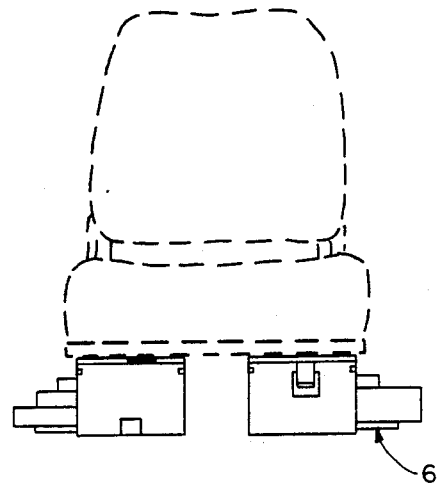
FIG. 2 is a front view of the grooved embodiment shown in place underneath the fishing seat with drawers open.
Figure 1:
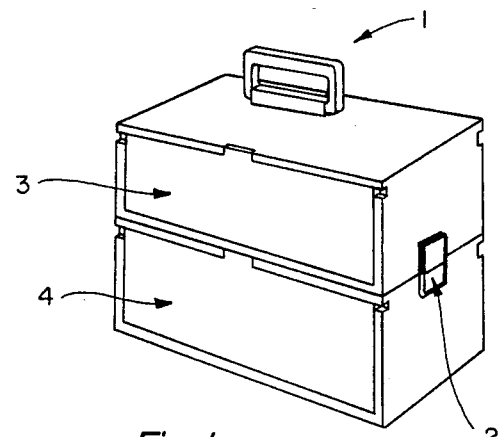
FIG. 1 is a perspective view of the tackle-box showing the front cover closed.
Figure 3:
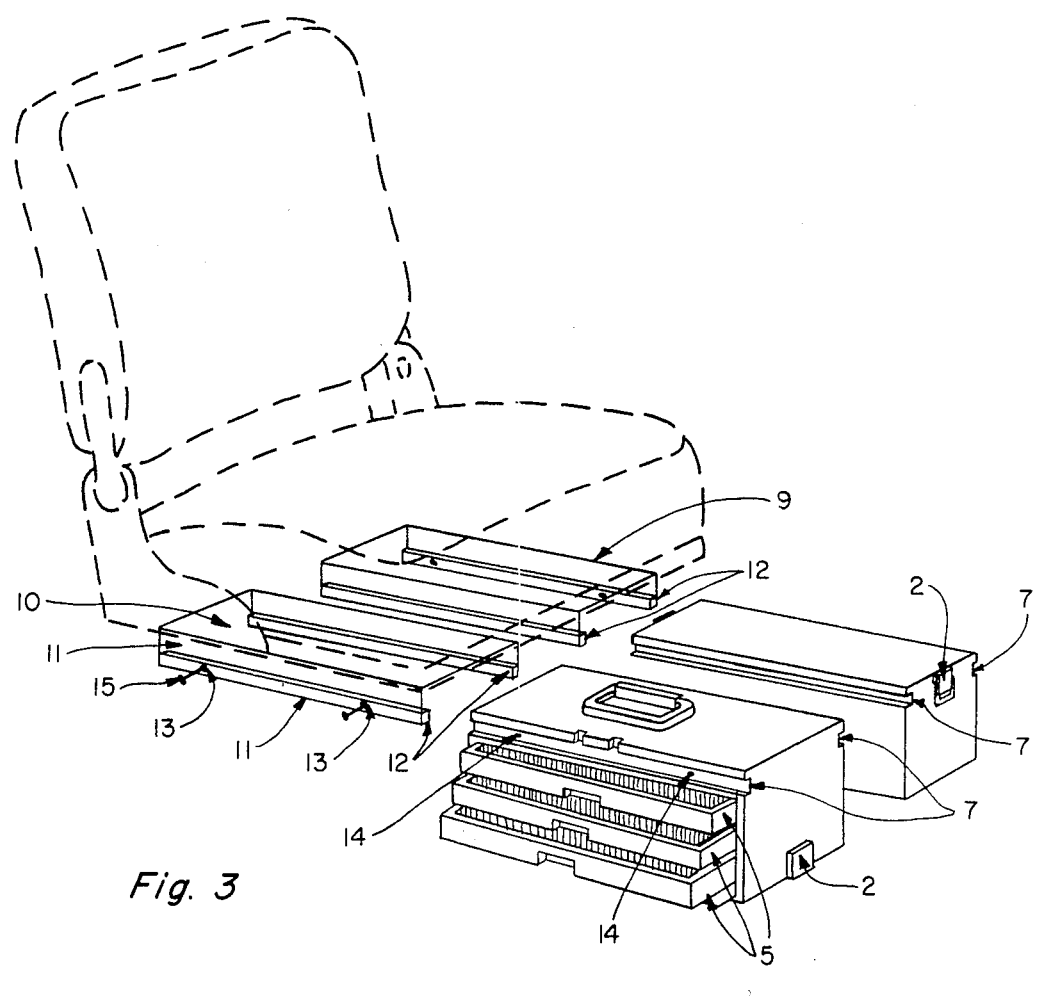
FIG. 3 is a perspective exploded view of the grooved embodiment of the tackle-box showing the brackets as attached underneath the seat.
Figure 7:
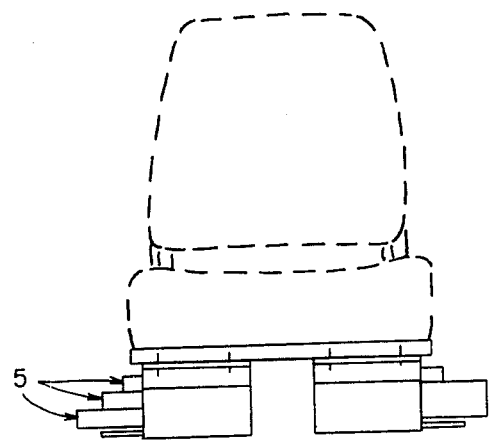
FIG. 7 shows a front view of the permanent-mount embodiment shown in place underneath the fishing seat with drawers open.

The tackle-box is shown generally as in FIG. 1 and comprises a handle (1), side latches (2) and upper (3) and lower (4) sections. Each section as shown in FIGS. 3, 6, and 7 have a plurality of trays (5) which open outwardly when pulled. The trays are kept in place when the tackle-box is moved by a front cover (6) as shown in FIG. 2. The tackle-box may be constructed of any suitable material such as wood, aluminum or plastic, but is most preferably made by polypropylene or plastic injection molding. Each tray slides on oppositely faced ridges set in each opposite side and the tray arrangement on the ridges is common to the art, found in any fishing-tackle catalog. The box itself is common to the art and is similar to the fishing box sold by Plano (Model 757 or 7777N) or Bass Pro Shops (Model 2275 or 2276) and is constructed in much the same fashion. However, the present invention has the added and special features as indicated below.

The Rees tackle-box is divided into two sections-an upper and a lower section. The upper section has a handle thereon but the lower section has a flat top. The sections may be coupled together for ease of transport be two latches (2) as shown in FIGS. 3 and 4. Other devices may be used to secure the two sections together when transporting the tackle-box, and the latches shown are for purposes of illustration and not meant as a limitation.

In addition to the box itself, this invention includes a means for mounting the sections underneath the seat. In the preferred embodiment shown in FIGS. 1, 2, and 3 each section has molded therein a longitudinal groove (7) along the upper edge of each section. Rectangular brackets (9) are attached to the bottom of the fishing seat as shown in FIG. 3 by any suitable attaching means. These rectangular brackets have a horizontal top (10) and sides that are perpendicular to the top (11). Each side has a longitudinal ridge (12) that is slightly smaller than the corresponding longitudinal groove in the sections. Through each side at the ridge are drilled two small apertures (13). Into the corresponding groove is also drilled two holes (14) so that when the section is slidably placed into the brackets, the holes line up in the ridge and groove. Once the sections are positioned correctly, a spring loaded bolt (15) is inserted through each hole to securedly fasten the section to the underside of the seat. The space between the ridge and the top of the section is large enough so that the handle clears the underside of the fishing seat.

The brackets as shown are fixed in the preferred relation to the chair, i.e., the drawers face opposite directions and open outwardly. In the preferred embodiment, the front faces of the sections are at an 180° angle to each other. However, other configurations are not precluded hereby and any convenient configuration is acceptable.

As the fisherman swivels in his chair, the attached sections turn likewise, always maintaining a constant position relative to the fisherman.

Upon completion of a day's fishing, one simply removes the spring loaded bolts, slides each section out from the brackets, attaches the upper and lower sections to each other and carries the tackle-box home.

Another attaching means is shown in FIGS. 4, 5, and 6. Instead of rectangular brackets, one simply mounts a plurality of short L-shaped brackets (16). The horizontal leg (17) of each bracket is attached to the underside of the seat by suitable attaching means. The vertical leg (18) of each bracket has a small hole (19) drilled therein. The upper part of each section has a corresponding hole (20) drilled therein to provide a passageway for the long threaded rod (21). The threaded rod is small enough in diameter to allow passage through the aperture (19) in the vertical leg of the bracket, though the aperture (20) in the near side (22) of the section and through the upper part of the section itself, exiting out the corresponding holes on the opposite side or far-side (22A) of the section. Once the holes are properly aligned and the long threaded rod inserted, the sections may be secured by tightening suitable bolts (23) thereon. The rod may be of any suitable material-aluminum, steel, or may also be of plastic. The bolts may also be of any suitable material.

Figure 8:
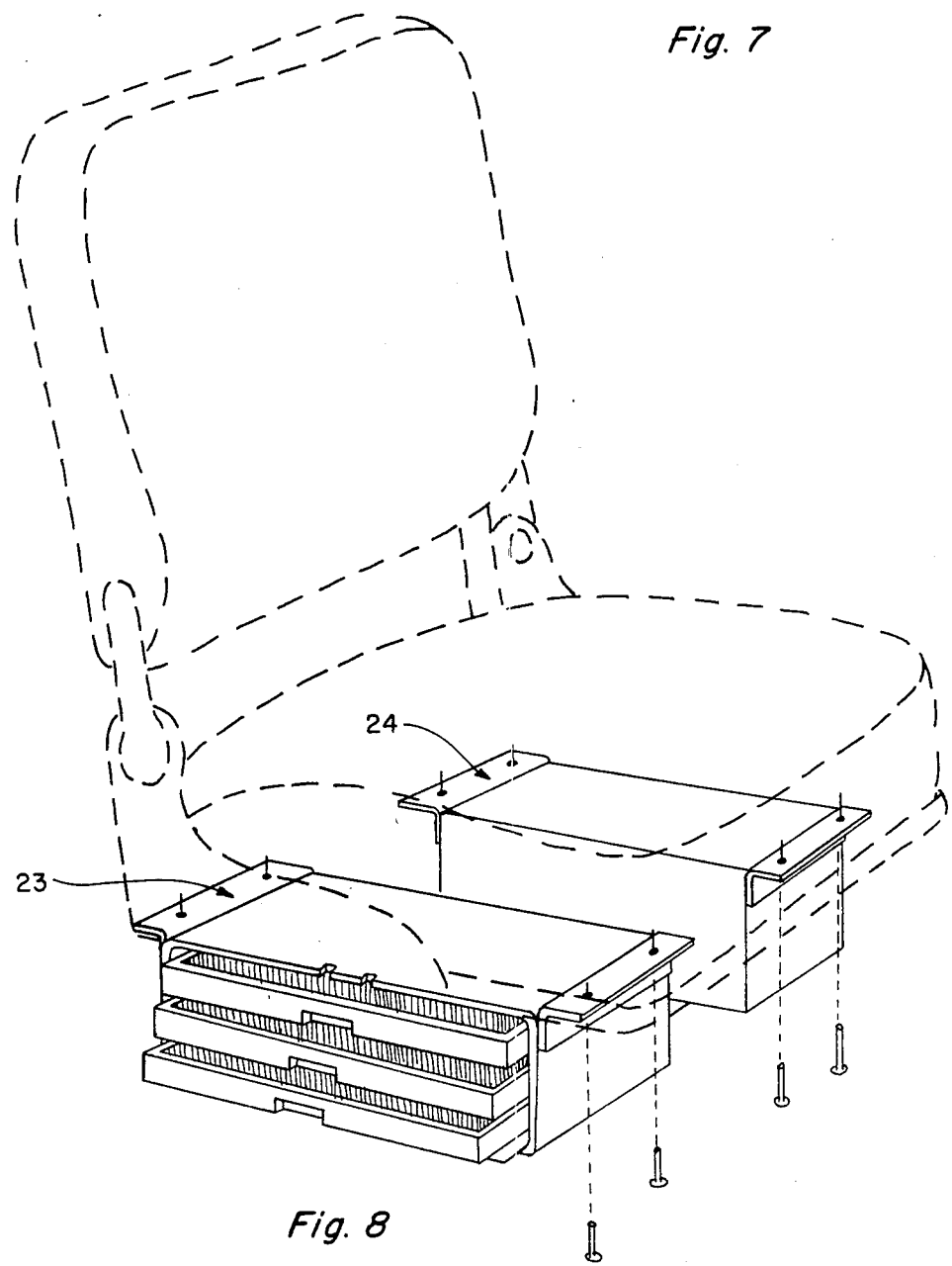
FIG. 8 is a perspective exploded view of the permanent-mount embodiment showing the long brackets.

The tackle-box may also be permanently mounted as shown in FIGS. 7 and 8. This mounting includes the use of two long L-shaped brackets for each section. The long L-shaped brackets have a horizontal leg (23) which is permanently attached to the underside of the seat as shown in FIG. 8 by any convenient and suitable means. The vertical leg (24) of each long L-shaped bracket is permanently attached to the upper portion of each side of each section. In this embodiment, the preferred method of attaching the vertical leg of each long L-shaped bracket is to have said long L-shaped bracket molded as one complete integral piece to each side of each section. No handle or latches are present on this particular embodiment as the tackle-box sections are permanently attached to the bottom of the seat.

Another method that may be used in permanently attaching the sections is to mold or make the long L-shaped brackets separately and to attach the vertical leg of each long L-shaped bracket to the upper portion of each side of each section by suitable attaching means, e. g. glueing or bolting the pieces together.

Many varying methods of attachment can be utilized herein, but the above consists of the preferred embodiment of this invention.

I claim:

1. A portable, attachable fishing tackle-box and mounting means, comprising:
   (1) a tackle-box having upper and lower sections detachably connected to each other by a latch means, each section comprising a shell with an esentially rectangular cross-section having a plurality of slidable drawers therein, a front cover which is slidably attached so as to fold underneath the bottom drawer to allow access to said drawers, and longitudinal attaching grooves on the upper back and front edges thereof;
   (2) a pair of attaching brackets each having a horizontal top fixedly attached to the underside of a single pedestal fisherman's swivel chair, and two perpendicular sides, each side having a longitudinal ridge projecting inwardly adapted for receipt of said longitudinal grooves in said tackle-box sections;
   whereby said upper and lower sections can be detached from each other and attached to the underside of a single pedestal fisherman's swivel chair so that the plurality of drawers in each section faces outwardly from each side of said chair.

2. A portable, attachable fishing tackle-box and mounting means as in claim 8, wherein each side of each attaching bracket has a plurality of bolt holes and each longitudinal ridge and groove has a plurality of corresponding holes, further comprising a plurality of spring-loaded bolts corresponding to said holes whereby when said upper and lower sections are positioned in said attaching brackets said bolts are inserted through said holes and securely fastened thereby.

3. A portable, attachable fishing tackle-box and mounting means, comprising:
   (1) a tackle-box having upper and lower sections, connected to each other by a latch means each section having a plurality of sliding drawers therein;
   (2) an attaching means for each section whereby each section may be detachably mounted to opposite sides of a single pedestal fisherman's swivel chair;
   whereby said upper and lower sections can be detached from each other and attached to the underside of a single pedestal fisherman's swivel chair so that the plurality of drawers in each section faces outwardly from each side of said chair.

* * * * *